Jan. 4, 1927.
J. C. BARR
1,613,432
HANDSAW
Filed March 1, 1926
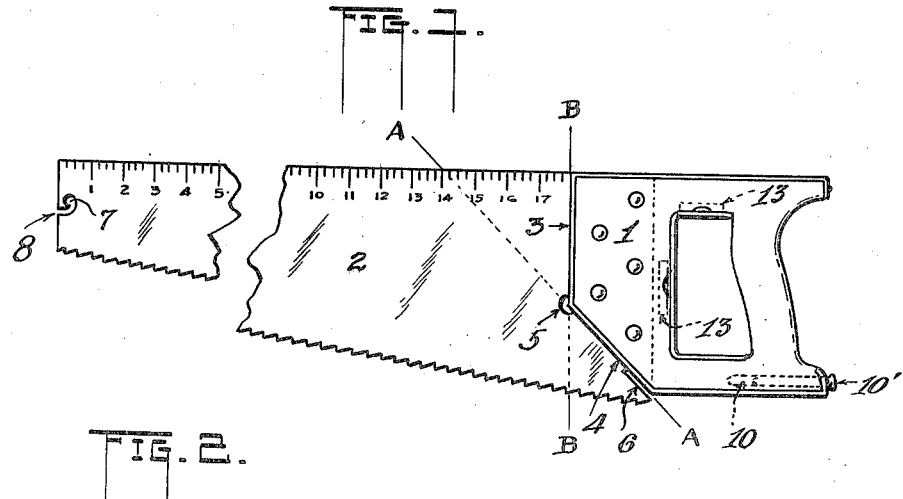
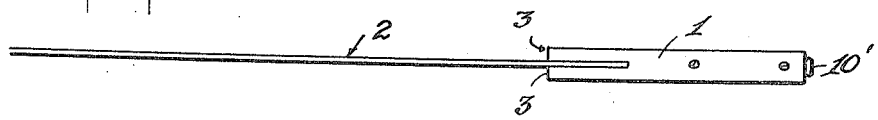
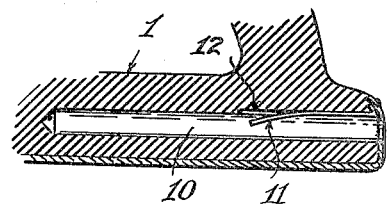
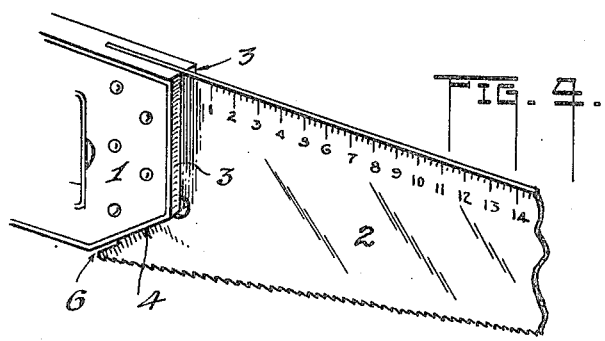
Inventor
J. C. Barr,
By L. M. Thurlow
Attorney Patented Jan. 4, 1927.

1,613,432

UNITED STATES PATENT OFFICE.

JAMES C. BARR, OF PEORIA, ILLINOIS.

HANDSAW.

Application filed March 1, 1926. Serial No. 91,337.

This invention relates to improvements in handsaws of that type used in wood working.

The object of the invention is to construct a tool having several advantages, in that in addition to its use as a saw, square, a triangle for mitering work, and also for plumbing and leveling, which combined in a saw is not new, I provide convenient openings in the saw blade by which the work may be seen so that more exact results are possible when used as a square or for mitering, besides furnishing a tool-holding pocket, and a convenient and altogether very useful means for suspending the saw, as will be pointed out herein.

In the appended drawing,

Fig. 1 is a side elevation of a saw in which my invention is incorporated,

Fig. 2 is a plan of the top edge of the saw,

Fig. 3 is a longitudinal section of part of the handle of the saw, and

Fig. 4 shows a part of the saw in perspective.

The handle of the saw is designated in general by the character 1, while 2 is the saw blade, the two being secured in fixed relation by any of the usual or accepted methods, said blade in this instance being let into the handle so that the latter extends from each side of the blade at 3.

The top edge of the blade 2 constitutes a straight-edge, while the projections 3 of the handle are disposed at right angles thereto, forming with said edge a square.

Again, the said handle includes the angled edges at 4 which for mitering purposes lie at an angle of 45° to the edge of the blade. While the provision of the square and angle is not new in a saw, yet I provide for readily determining whether the straight edges of the handle used for the above purposes lie squarely against the work. In Fig. 1 the line A—A may be taken to represent the position of the edge of a board, for example, against which the 45° angle at 4 is to lie when preparing for marking in mitering work, and B—B may represent a board-edge against which the edge 3 is to abut in squaring a board. Now, due to the fact that the saw blade is usually wider than the handle, and since said blade must lie upon the top of the work so that proper markings may be made, the handle-edge below the blade used for the square or miter cannot be seen, and it is difficult if not impossible to determine whether the said handle-edge is lying squarely upon the edge of the work and the workman cannot be assured that his markings will be absolutely correct. In order, therefore, that he may be assured of the relation of the handle-edge to the edge of the work the saw blade is apertured at 5 at the angle where the surfaces 3 and 4 meet. Also, at a distance from the opening 5 and adjacent the handle surface 4 the saw blade is cut away severing the blade at its edge.

It is believed to be clear that when the saw is used as a square although the workman may easily determine that the surface 3 at the upper edge of the blade is in proper contact and relation to the work he cannot be assured of the position of that portion of the edge terminating midway the saw blade, since hidden from view, and there is nothing, therefore, to assist him. But by providing the aperture 5, the edges of the work and handle are visible, and correct adjustment is always possible, and the same is true in mitering where there is no guide and where the sense of touch must enter into the use of the angle at 4. However, the aperture 5 is a source of verification, aided by the slot 6.

The free extremity of the saw blade 2 near its edge is provided with an aperture 7 and communicating with it is a slot 8 which cuts through the edge of the blade, substantially as shown, said slot opening into the aperture at a point farthest from the said edge. By this provision the saw may be hung upon a nail, a stretched cord, or the like that may be handy. In order to hang the saw the open slot is presented to the nail or wire and a slight push on said saw results in locating the said nail or wire in the aperture due to the curved wall of said slot and its guiding action. Thus the saw may be hung upon any object small enough to enter the slot, whether that object is a nail whose head is too large to pass through the aperture, or whether used upon a wire or cord as stated.

In addition to the conveniences mentioned I provide a recess or pocket for receiving a pencil, scratch awl, or other tool 10′ required to be constantly at hand when working with a saw. This recess or pocket is designated at 10, and is created in the handle 1 substantially in the position shown, by drilling into it, there being a flat spring 11, for example, seated in the groove 12 in the side of the bore, or it may be secured in the bore itself if made greater in diameter than the article to be held. The spring, of course, is provided for maintaining friction on the article, preventing it from leaving said recess or pocket.

As a convenience, also, spirit glasses 13 are placed in two of the walls of the eye of the handle 1, one of which serves as a plumb and the other for leveling purposes, neither of which, however, is claimed as new herein in a saw.

I claim:

1. In a carpenter's saw, its blade having a straight edge, and a handle having a straight surface on two of its edges lying at an angle to one another and meeting one another, each surface being disposed at an angle to the blade's edge, there being an opening in the saw blade at the meeting point or angle of the two surfaces exposing part of each of said surfaces.

2. In a carpenter's saw, its blade having a straight edge, and a handle having a straight surface on two of its edges lying at an angle to one another and meeting one another, each surface being disposed at an angle to the blade's edge, there being an opening in the saw blade at the meeting point or angle of the two surfaces exposing part of each of said surfaces, there being an opening in the blade distant from the first opening, the same being directly adjacent one of the said surfaces of the handle.

3. In a carpenter's saw, its blade having a straight edge, and a handle having a straight surface on two of its edges lying at an angle to one another and meeting one another, each surface being disposed at an angle to the blade's edge, there being an opening in the saw blade at the meeting point or angle of the two surfaces exposing part of each of said surfaces, there being an opening in the blade distant from the first opening, the same being directly adjacent one of the said surfaces of the handle severing the blade adjacent one of its edges.

In testimony whereof I affix my signature.

JAMES C. BARR.